(12) United States Patent
Saito (10) Patent No.: US 9,461,774 B2
(45) Date of Patent: Oct. 4, 2016

(54) RECEPTION CIRCUIT OF IMAGE DATA, ELECTRONIC DEVICE USING THE SAME, AND METHOD OF TRANSMITTING IMAGE DATA

(71) Applicant: ROHM CO., LTD., Ukyo-ku, Kyoto (JP)

(72) Inventor: Shinichi Saito, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 69 days.

(21) Appl. No.: 14/609,903

(22) Filed: Jan. 30, 2015

(65) Prior Publication Data

US 2015/0220383 A1 Aug. 6, 2015

(30) Foreign Application Priority Data

Jan. 31, 2014 (JP) ................................ 2014-017403

(51) Int. Cl.
| | |
|---|---|
| H04L 1/00 | (2006.01) |
| G06F 11/00 | (2006.01) |
| H04N 19/89 | (2014.01) |
| H04N 19/436 | (2014.01) |

(52) U.S. Cl.
CPC .......... *H04L 1/0061* (2013.01); *H04N 19/436* (2014.11); *H04N 19/89* (2014.11)

(58) Field of Classification Search
CPC .... H04N 5/367; H04N 19/436; H04N 19/89; H04N 19/88; H04N 19/895; H04N 7/64; H04L 1/0061
See application file for complete search history.

(56) References Cited

U.S. PATENT DOCUMENTS

| | | | | |
|---|---|---|---|---|
| 6,360,058 B1* | 3/2002 | Yoshimoto | ........... | H04N 19/895 |
| | | | | 375/E7.281 |
| 6,995,794 B2* | 2/2006 | Hsu | ........................ | H04N 5/232 |
| | | | | 348/241 |
| 7,424,206 B2* | 9/2008 | Kouzai | ............ | G11B 20/00007 |
| | | | | 386/323 |
| 2007/0126618 A1* | 6/2007 | Tanaka | .................... | G09G 3/006 |
| | | | | 341/155 |

FOREIGN PATENT DOCUMENTS

| | | |
|---|---|---|
| JP | 2000078027 A | 3/2000 |
| JP | 2007096903 A | 4/2007 |

* cited by examiner

*Primary Examiner* — Christine Tu
(74) *Attorney, Agent, or Firm* — Cantor Colburn LLP (57) ABSTRACT

A reception circuit for receiving serial data including first pixel data constituting image data from a transmission circuit, wherein the serial data has a format allowing the reception circuit to detect a transmission error, the reception circuit including a serial-to-parallel converter configured to receive the serial data and convert the received serial data into first parallel data, an error detector configured to determine whether the first parallel data is correct or erroneous based on the first parallel data, a correcting buffer configured to maintain the first pixel data included in the first parallel data if the first parallel data is determined to be correct by the error detector, and a correcting unit configured to substitute the first pixel data included in the first parallel data determined to be erroneous by the error detector with a value corresponding to second pixel data stored in the correcting buffer.

20 Claims, 7 Drawing Sheets

|     | 6   | 5  | 4  | 3 | 2 | 1 | 0 |
|-----|-----|----|----|---|---|---|---|
| PD1 | [ G | R  | R  | R | R | R | R ] |
| PD2 | [ B | B  | G  | G | G | G | G ] |
| PD3 | [ DE | VS | HS | B | B | B | B ] |
| PD4 | [EDB | B  | B  | G | G | R | R ] |

RECEPTION CIRCUIT OF IMAGE DATA, ELECTRONIC DEVICE USING THE SAME, AND METHOD OF TRANSMITTING IMAGE DATA

CROSS-REFERENCE TO RELATED APPLICATIONS

This application is based upon and claims the benefit of priority from Japanese Patent Application No. 2014-017403, filed on Jan. 31, 2014, the entire contents of which are incorporated herein by reference.

TECHNICAL FIELD

The present disclosure relates to a serial transmission system for transmitting image data.

BACKGROUND

In transmitting and receiving data between semiconductor integrated circuits via a small number of data transmission lines, a serial data transmission scheme may be used. In such a serial data transmission scheme, parallel data to be transmitted is converted into serial data, and the converted serial data is transmitted together with synchronization clock thereof. Then, a receiver converts the serial data back into parallel data using the synchronization clock.

For example, in an electronic device including a display panel, serial data transmission is generally used to transmit image data (including video and still image data) from a frame memory which stores the image data to a driver circuit of the display panel.

Recently, in line with enhancement of image quality, the number of pixels per frame and a frame rate tend to increase, and accordingly, transmission capacity required in a transmission system also increases. In the case where large amounts of image data are transmitted serially at a high speed, even though a transmission error occurs, there is no time to spare for transmitting the correct data again. As a result, erroneous image data due to the transmission error may be displayed as it is on the display panel, and a viewer may recognize vulnerability through the disturbance of an image.

SUMMARY

The present disclosure provides some embodiments of a transmission technique capable of suppressing disturbance of an image displayed on a display panel even when a transmission error occurs.

According to one embodiment of the present disclosure, provided is a reception circuit for receiving serial data including first pixel data constituting image data from a transmission circuit, wherein the serial data has a format allowing the reception circuit to detect a transmission error, the reception circuit including: a serial-to-parallel converter configured to receive the serial data and convert the received serial data into first parallel data; an error detector configured to determine whether the first parallel data is correct or erroneous based on the first parallel data; a correcting buffer configured to maintain the first pixel data included in the first parallel data if the first parallel data is determined to be correct by the error detector; and a correcting unit configured to substitute the first pixel data included in the first parallel data determined to be erroneous by the error detector with a value corresponding to second pixel data stored in the correcting buffer.

With regard to a specified pixel constituting image data, luminance of the specified pixel may be similar to luminance of a pixel adjacent to the specified pixel or similar to luminance of the same pixel prior to one frame in some examples. In this aspect, pixel data included in parallel data determined to be correct in the past is maintained as pixel data indicative of correct luminance. Based on this, pixel data included in parallel data determined to be erroneous, i.e., pixel data indicative of erroneous luminance may be replaced by the pixel data indicative of correct luminance which in turn suppressing disturbance of an image.

The correcting unit may substitute the first pixel data included in the first parallel data determined to be erroneous by the error detector with the second pixel data stored in the correcting buffer.

The correcting unit may substitute the first pixel data included in the first parallel data determined to be erroneous by the error detector with a value calculated from the second pixel data stored in the correcting buffer. For example, an average of pixel data of adjacent pixels stored in the correcting buffer may be calculated.

The correcting unit may substitute the first pixel data included in the first parallel data determined to be erroneous by the error detector with a value corresponding to third pixel data of a pixel adjacent to a pixel associated with the second pixel data stored in the correcting buffer.

The correcting buffer may store the second pixel data for one pixel line.

The correcting buffer may store the second pixel data for one frame.

The serial data is parallel-to-serial converted from the second parallel data including at least one bit for error detection.

The serial data is parallel-to-serial converted from the second parallel data and the second parallel data may be encoded in a format allowing the reception circuit to detect a transmission error through a decoding process in the reception circuit.

The serial data is parallel-to-serial converted from the second parallel data including a synchronization signal that is regularly changed over time in addition to the first pixel data, and the error detector may determine whether the first parallel data is correct or erroneous by comparing the synchronization signal included in the first parallel data with an expectation pattern corresponding to the synchronization signal.

In some embodiments, the reception circuit may further include a synchronization signal generating unit configured to compare the synchronization signal with the expectation pattern corresponding to the synchronization signal and correct the synchronization signal based on the expectation pattern if the synchronization signal is different from the expectation pattern. Accordingly, even when a transmission error occurs in the synchronization signal, an image may be correctly displayed.

The serial data may include M bits (where M is an integer equal to or greater than 2) and is transmitted through parallel N lanes (where N is an integer equal to or greater than 2), and M×N bits including R data, G data, and B data as the first pixel data are transmitted at a time.

M may be equal to or greater than 7 and N may be 4, and each of the R data, the G data, and the B data may have 8 bits, and at least 28 bits may include 1 bit of an enable signal, 1 bit of a vertical synchronization signal, and 1 bit of a horizontal synchronization signal, in addition to 24 bits of the first pixel data are transmitted at a time.

The at least 28 bits may further include 1 bit for error detection. Accordingly, all bits may be effectively used.

The reception circuit may be integrally integrated on a single semiconductor substrate. "Integrally Integrated" may include a case in which all the components of a circuit are formed on a semiconductor substrate or a case in which major components of a circuit are integrally integrated, and some resistors, capacitors, or the like may be installed outside of the semiconductor substrate in order to adjust circuit constants.

By integrating a circuit into a single IC, a circuit area may be reduced and characteristics of a circuit element may also be uniformly maintained.

According to another embodiment of the present disclosure, provided is an electronic device. The electronic device may include the reception circuit having at least one of the features described above.

Also, arbitrarily combining the foregoing components or converting the expression of the present disclosure between a method and an apparatus may also be valid as an aspect of the present disclosure.

DETAILED DESCRIPTION

Hereinafter, embodiments of the present disclosure will be described with reference to the drawings. Similar or equivalent components, members, and processes illustrated in each drawing are given similar reference numerals and a repeated description thereof will be properly omitted. Also, the embodiments are merely illustrative, without limiting the present disclosure, and any feature or combination thereof described in the embodiments may not necessarily be essential to the present disclosure.

In the present disclosure, "a state in which a member A is connected to a member B" includes a case in which the member A and the member B are physically directly connected or even a case in which the member A and the member B are indirectly connected through any other member that does not affect an electrical connection state thereof.

Similarly, "a state in which a member C is installed between a member A and a member B" also includes a case in which the member A and the member C or the member B and the member C are indirectly connected through any other member that does not affect an electrical connection state, in addition to a case in which the member A and the member C or the member B and the member C are directly connected.

Figure 1:
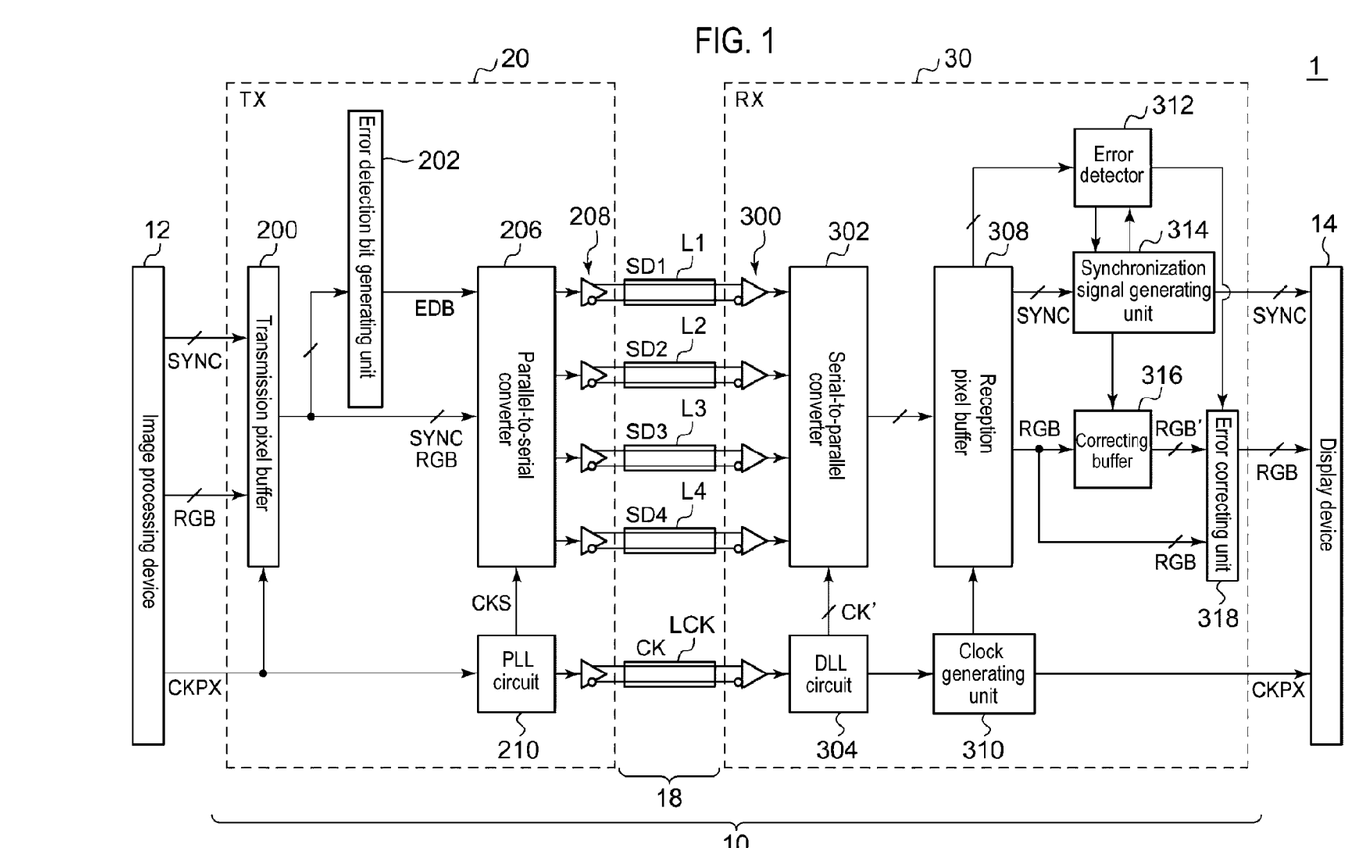
FIG. 1 is a block diagram of a transmission system according to an embodiment of the present disclosure.

FIG. 1 is a block diagram of a transmission system 10 according to an embodiment of the present disclosure. The transmission system 10 may be used in an electronic device 1 having a display device. The electronic device 1 includes an image processing device 12 and a display device 14 in addition to the transmission system 10. The image processing device 12 may be a central processing unit (CPU) or a graphics processing unit (GPU) and generate image data (including still image and video data) to be displayed on the display device 14. In many electronic devices 1, the image processing device 12 and the display device 14 may be arranged to be spaced from one another. The transmission system 10 transmits image data from the image processing device 12 to the display device 14.

The transmission system 10 includes a transmission circuit 20, a transmission channel 18, and a reception circuit 30. The transmission circuit 20 and the reception circuit 30 are configured to convert pixel data constituting image data into a serial format and perform high speed serial transmission through the transmission channel 18. In this embodiment, a description is made for the case in which the transmission channel 18 includes a plurality (M number) (e.g., M=4 in this embodiment) of lanes L1 to L4 and a clock lane LCK. Pixel data constituting image data (hereinafter, referred to as "RGB" data) includes luminance data of R, G, and B subpixels of three colors included in the pixel (hereinafter, referred to as subpixel data or R data, G data, and B data). The transmission circuit 20 may receive RGB data and a pixel clock CKPX in synchronization with the RGB data from the image processing device 12. A period of the pixel clock CKPX is in proportion to a generation period of RGB data.

Additionally, the transmission circuit 20 may receive a synchronization signal SYNC generated by the image processing device 12 in line with the RGB data. The synchronization signal SYNC includes a horizontal synchronization signal HSYNC, a vertical synchronization signal VSYNC, and a data enable signal DE, as described later.

The transmission circuit 20 includes a transmission pixel buffer 200, an error detection bit generating unit 202, a parallel-to-serial converter 206, a differential driver 208, and a phase locked loop (PLL) circuit 210. The transmission circuit 20 may be configured as a functional integrated circuit (IC) integrated on a single semiconductor substrate.

The transmission pixel buffer 200 may latch the pixel data RGB and the synchronization signal SYNC, which are output from the image processing device 12, by using the pixel clock CKPX, and the pixel data RGB and the synchronization signal SYNC are stored in the transmission pixel buffer 200.

The error detection bit generating unit 202 is configured to perform required signal processing in order to detect a transmission error in a reception circuit 30. Specifically, the error detection bit generating unit 202 may generate an error detection bit EDB to be embedded in serial data and transmitted via the transmission channel 18. Error detection may be performed by using a known technique and is not particularly limited in the present disclosure. For example, a check sum data scheme, a parity bit scheme, a block check character (BCC) scheme, or a cyclic redundancy check (CRC) may be used.

Figure 2:
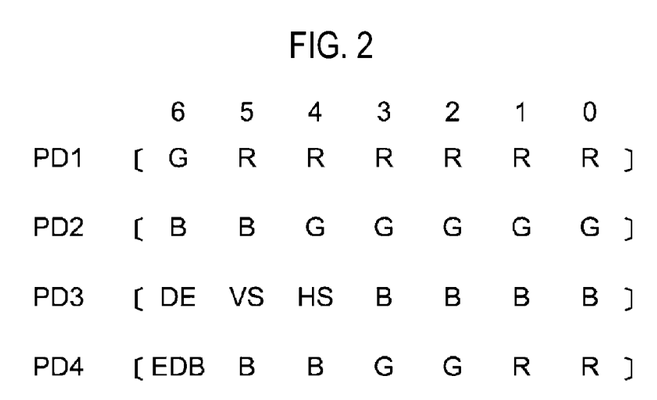
FIG. 2 is a view illustrating an example of a data structure of parallel data.

The parallel-to-serial converter 206 may receive the pixel data RGB and the synchronization signal SYNC stored in the transmission pixel buffer 200, and the error detection bit EDB, and encode the pixel data RGB, the synchronization signal SYNC and the error detection bit EDB into M (e.g., =4) number of parallel data PD1 to PD4 based thereon. FIG.

2 is a view illustrating an example of a data structure of the parallel data PD1 to PD4. Each parallel data PD has N bits. In FIG. 2, an example of N=7 bits is shown. Each subpixel data has 8 bits.

When each parallel data has 1 word which is N bits, M×N bits can be transmitted by M number of parallel data at a time. In this embodiment, 4×7=28 bits are simultaneously transmitted. Among the 28 bits, 24 bits are allocated to the RGB data, 3 bits are allocated to the synchronization signal SYNC, and the remaining 1 bit is allocated to the error detection bit EDB. Further, the data structure of the parallel data PD1 to PD4 is not particularly limited and each bit may be appropriately replaced.

The PLL circuit 210 may multiply a frequency of the pixel clock CKPX by N to generate a serial clock CKS. The parallel-to-serial converter 206, in synchronization with the serial clock CKS, converts four parallel data PD1 to PD4 into serial data SD1 to SD4. Accordingly, the serial data having a format allowing the reception circuit 30 to detect a transmission error is generated by the transmission pixel buffer 200.

The differential driver 208 outputs four serial data SD1 to SD4 to the first to fourth data lanes L1 to L4, respectively, and also outputs the same frequency as that of the serial clock CKS or a clock signal CK, obtained by dividing the serial clock CKS, to the clock lane LCK.

The configuration of the transmission circuit 20 has been described. Subsequently, the reception circuit 30 will be described.

The reception circuit 30 includes a differential receiver 300, a serial-to-parallel converter 302, a delay locked loop (DLL) circuit 304, a reception pixel buffer 308, a clock generating unit 310, an error detector 312, a synchronization signal generating unit 314, a correcting buffer 316, and an error correcting unit 318. The reception circuit 30 may be configured as a functional integrated circuit (IC) integrated on a single semiconductor board.

The differential receiver 300 may receive the serial data SD1 to SD4 and the clock signal CK input through the transmission channel 18.

The DLL circuit 304 is configured to generate a sampling clock CK in synchronization with the clock signal CK. The serial-to-parallel converter 302 is configured to convert four serial data SD1 to SD4 into parallel data PD1 to PD4, respectively, in synchronization with the sampling clock CK'.

The clock generating unit 310 may generate a pixel clock CKPX having the same frequency as that of the pixel clock CKPX of the transmission circuit 20. Processing in units posterior to the reception pixel buffer 308 may be performed in synchronization with the pixel clock CKPX.

The error detector 312 is configured to determine whether a transmission error occurs with reference to the error detection bit EDB stored in the reception pixel buffer 308. When a transmission error is detected, the error detector 312 determines that the parallel data PD1 to PD4 are not correct. On the other hand, when a transmission error is not detected, the error detector 312 determines that the parallel data PD1 to PD4 are correct.

The synchronization signal generating unit 314 may receive a synchronization signal SYNC and output the synchronization signal SYNC to the display device 14. Here, the synchronization signal SYNC, specifically, the vertical synchronization signal VSYNC, the horizontal synchronization signal HSYNC, and the enable signal DE may be regularly (e.g., periodically) changed over time. That is, the reception circuit 30 may estimate a correct value (an expectation pattern) to be related with the synchronization signal SYNC with respect to each pixel. Thus, the error detector 312 may determine whether the parallel data PD1 to PD4 are indicative of correct or erroneous by comparing the synchronization signal SYNC with the expectation pattern.

For example, with respect to a certain synchronization signal SYNC, four continuous pixels may be used. The synchronization signal SYNC may not transition twice within the four continuous pixels. Thus, based on a level transition (edge) of the synchronization signal SYNC, if a level transition is detected two or more times within four continuous pixels, it may be determined as a transmission error.

Further, the synchronization signal generating unit 314 may correct the synchronization signal SYNC based on the result of the comparison between the synchronization signal SYNC and the expectation pattern. That is, when the received synchronization signal SYNC does not meet the expectation pattern (e.g., the received synchronization signal SYNC is different from the expectation pattern), the synchronization signal generating unit 314 may correct the synchronization signal SYNC based on the expectation pattern. Accordingly, even when a transmission error occurs in the synchronization signal SYNC, a correct synchronization signal SYNC may be reproduced to correctly display an image.

When the parallel data is determined to be correct by the error detector 312, the correcting buffer 316 keeps the pixel data RGB included in the corresponding parallel data in the correcting buffer 316. For example, the correcting buffer 316 may be a line buffer for storing pixel data for one pixel line from the currently received pixel. For example, in the case in which the display device 14 includes a display region of 640×480 pixels, pixel data RGB of immediately previous 640 pixels is maintained in the line buffer. In the case in which incorrect pixel data RGB is generated with respect to a certain pixel, correct pixel data RGB of an adjoining pixel may be stored in the line buffer.

The error correcting unit 318 may substitute the pixel data RGB included in the parallel data PD1 to PD4, which the error detector 312 determines to be erroneous, with a value corresponding to pixel data RGB' stored in the correcting buffer 316.

The corrected RGB data is transmitted to the display device 14 for use in the next stage. The configuration of the transmission system 10 has been described. Subsequently, an operation thereof will be described.

As described above, the serial data SD1 to SD4 transmitted through the transmission channel 18 may have a format allowing for error detection by the reception circuit 30. Further, the error detector 312 is configured to detect a transmission error based on the error detection bit EDB.

Pixel data stored in the correcting buffer 316 may be updated depending on whether an error is detected or not by the error detector 312. When a transmission error is detected, the error correcting unit 318 selects the pixel data RGB' stored in the correcting buffer 316. On the other hand, when a transmission error is not detected, the error correcting unit 318 selects the pixel data RGB' in the reception pixel buffer 308. The error correcting unit 318 outputs a value corresponding to the selected pixel data to the display device 14.

Processing performed by the error correcting unit 318 will be described.

(First Correction Processing)

Figure 3:
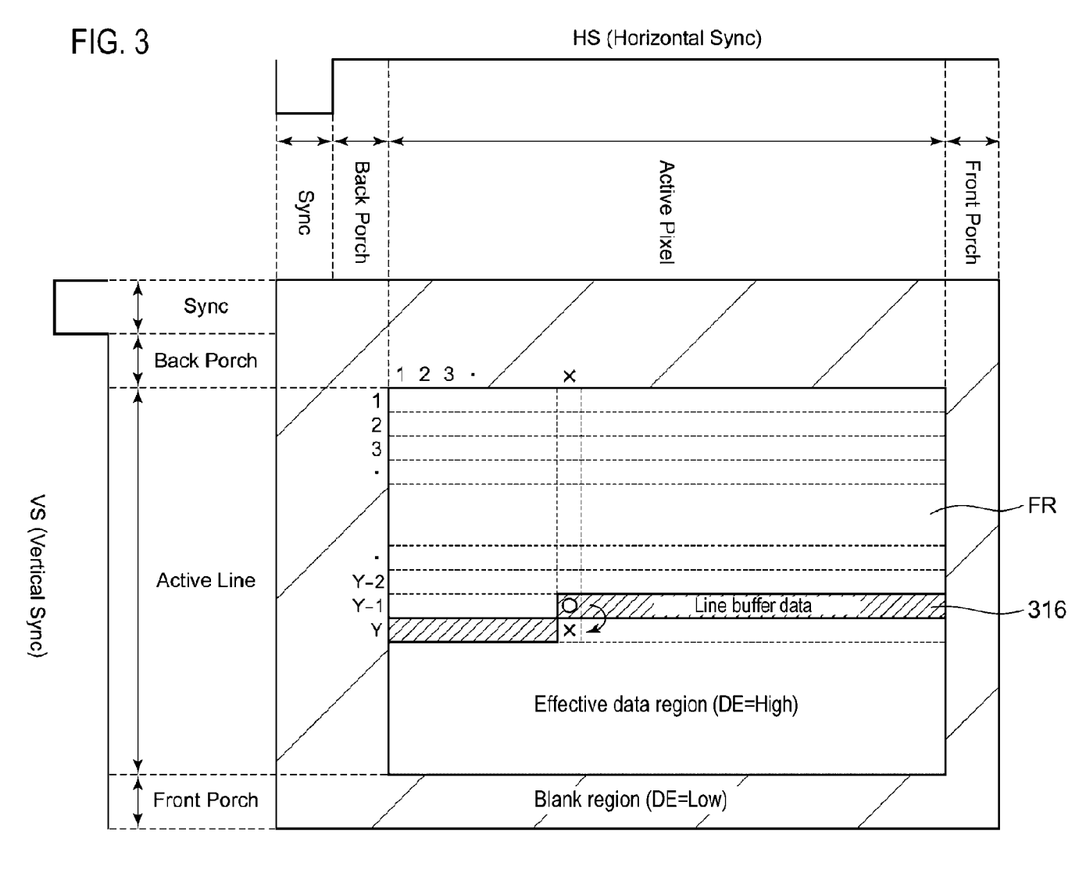
FIG. 3 is a view illustrating first correction processing.

FIG. 3 is a view illustrating first correction processing. For example, the error correcting unit 318 substitutes the pixel data RGB included in the parallel data determined to be erroneous by the error detector 312 with the pixel data RGB' stored in the correcting buffer 316. In FIG. 3, coordinates (X, Y) denote a currently received pixel. The pixel data RGB' is pixel data of a pixel adjacent to the error-detected pixel. The adjacent pixel may be a pixel $P_H$ adjacent in a horizontal direction (a leftward direction) or a pixel $P_V$ adjacent in a vertical direction (an upward direction) perpendicular to one previous pixel line.

Further, with respect to pixels of a first row, there may be no pixel line adjacent in a vertical direction. In this case, the correcting buffer 316 may additionally maintain pixel data of the first row of a previous frame immediately before the current frame. With such configuration, correction may be performed based on the past frame data (e.g., previous frame data) FR.

(Second Processing)

The error correcting unit 318 substitutes the pixel data RGB included in the parallel data determined to be erroneous by the error detector 312 with a value calculated from the pixel data RGB' stored in the correcting buffer 316. For example, a value obtained by averaging a plurality of pixel data RGB' adjacent to the current pixel (X, Y) may be used.

(Third Processing)

The correcting buffer 316 may maintain pixel data for one frame, rather than for one pixel line. In this case, the correcting buffer 316 may correct the currently erroneous data with reference to pixel data of the same pixel prior to one frame.

The operation of the transmission system 10a has been described.

With regard to a specified pixel constituting image data, luminance of the specified pixel may be similar to luminance of a pixel adjacent to the specified pixel or similar to luminance prior to one frame of the same pixel in some examples. The correcting buffer 316 maintains pixel data included in the parallel data determined to be correct in the past, as pixel data indicative of correct luminance. Accordingly, the pixel data included in the parallel data determined to be erroneous, i.e., pixel data indicative of erroneous luminance may be replaced by the pixel data indicative of correct luminance which in turn suppressing disturbance of an image.

Figure 6:
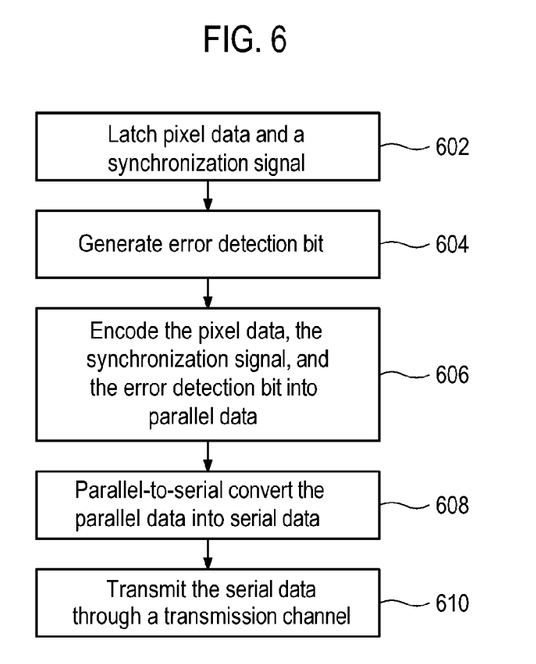
FIG. 6 is a flowchart of an exemplary process performed in a transmission circuit of FIG. 1 according to one embodiment of the present disclosure.

FIG. 6 is a flowchart of an exemplary process performed in the transmission circuit 20 of FIG. 1 according to one embodiment of the present disclosure. The transmission circuit 20 may latch pixel data RGB and a synchronization signal SYNC, at 602. In one embodiment, the transmission circuit 20 may latch the pixel data RGB and the synchronization signal SYNC received from the image processing device 12 by using a pixel clock signal CKPX. The transmission circuit 20 may generate an error detection bit EDB to be embedded in serial data, at 604. The transmission circuit 20 may encode the pixel data RGB, the synchronization signal SYNC, and the error detection bit EDB into M number of parallel data (e.g., 4 parallel data) based thereon, at 606. Once the parallel data is generated, the transmission circuit 20 may parallel-to-serial convert the parallel data to serial data, at 608. Upon converting to the serial data, the transmission circuit 20 may transmit the serial data to the reception circuit 30 through the transmission channel 18, at 610.

Figure 7:
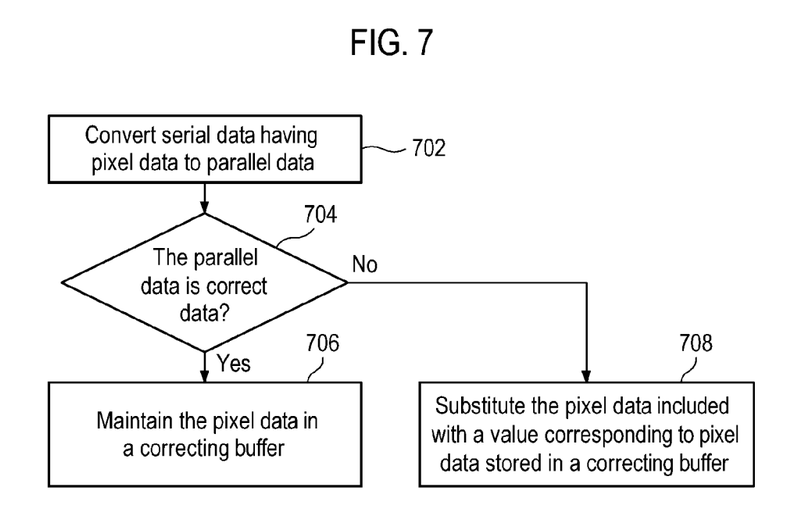
FIG. 7 is a flow chart of an exemplary process performed in a reception circuit of FIG. 1 according to one embodiment of the present disclosure.

FIG. 7 is a flow chart of an exemplary process performed in the reception circuit 30 of FIG. 1 according to one embodiment of the present disclosure. The reception circuit 30 may convert the serial data having the pixel data RGB which is received from the transmission circuit 20 to parallel data, at 702. Once the serial data is converted to the parallel data, the reception circuit 30 may determine whether the parallel data is correct or erroneous, 704. In one embodiment, the reception circuit 30 may perform such a determination by comparing the synchronization signal SYNC with an expectation pattern. If the parallel data is determined to be correct, the reception circuit 30 may maintain the pixel data RGB in the correcting buffer 316, at 706. On the other hand, if the parallel data is determined to be erroneous, the reception circuit 30 may substitute the pixel data RGB with a value corresponding to or related to pixel data stored in the correcting buffer 316, at 708.

The present disclosure has been described based on the embodiment. The embodiment is illustrative and there may be various modified examples of each component, each process, and a combination thereof. Hereinafter, some of such modified examples will be described.

Modified Example 1

Figure 4:
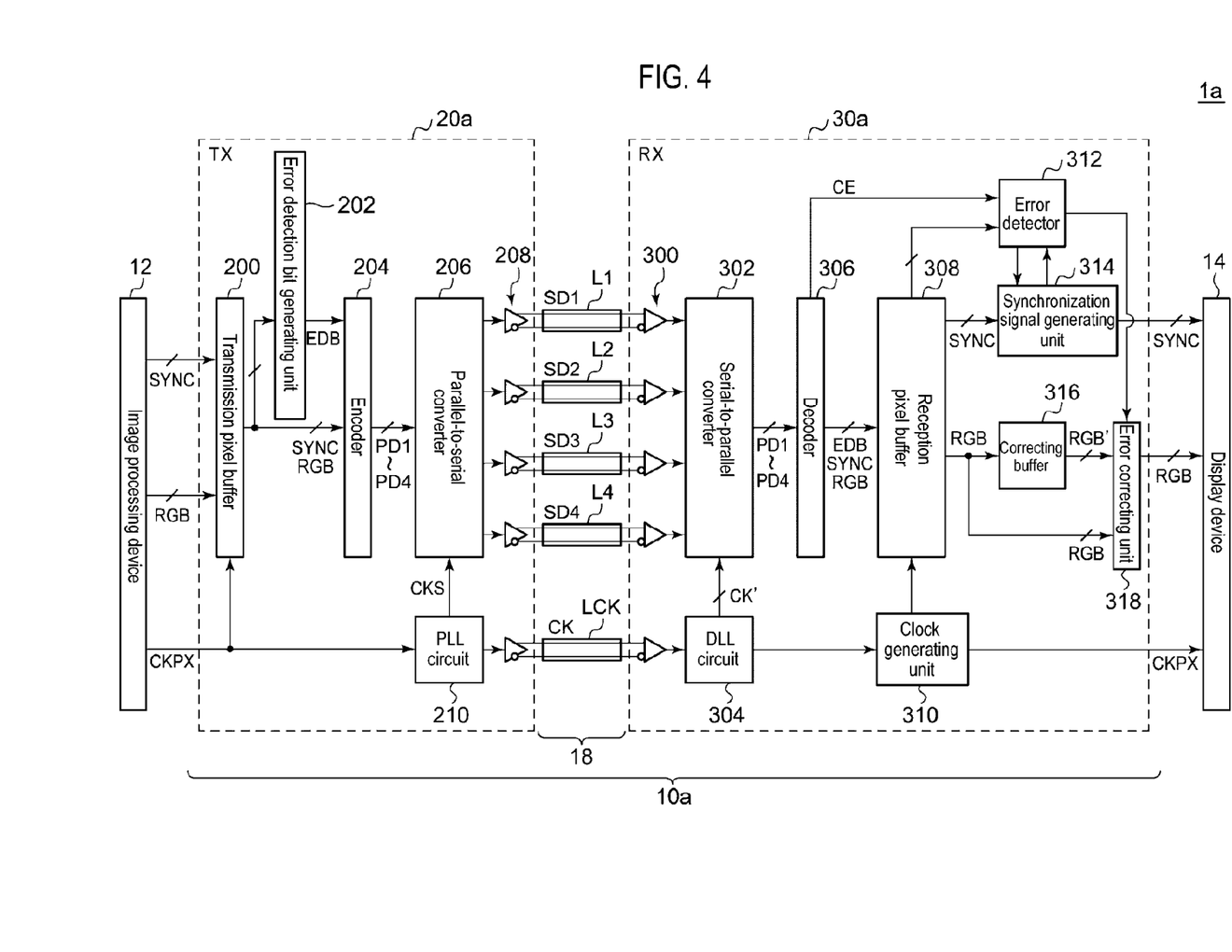
FIG. 4 is a block diagram of a transmission system according to a first modified example.

FIG. 4 is a block diagram of a transmission system 10a according to a first modified example.

In this embodiment, an error detection bit EDB may be incorporated into transmitted data to allow the reception circuit 30 to detect a transmission error, but the present disclosure is not limited thereto. In this modified example, a transmission circuit 20a may further include an encoder 204.

The encoder 204 may receive the pixel data RGB and the synchronization signal SYNC stored in the transmission pixel buffer 200, and the error detection bit EDB and encode the pixel data RGB, the synchronization signal SYNC and the error detection bit EDB into M (e.g., M=4) number of parallel data PD1 to PD4 based thereon. For the encoding process, an algorithm allowing the reception circuit 30a to detect a code error may be employed. For example, 8B10B coding scheme, 10B12B coding scheme, 64B/66B coding scheme, Manchester coding scheme, run length limited (RLL) encoding scheme, eight-to-fourteen modulation (EFM) scheme, or the like may be used. In particular, in the case of employing the DC balance encoding scheme such as the 8B10B coding scheme, the 10B12B coding scheme, or the like, appearance frequency of a high level and a low level of a bit stream may be made uniform, and thus electromagnetic interference (EMI) may be prevented.

That is, in this modified example, in addition to error detection based on an error detection bit EDB and error detection based on a synchronization signal, error detection through the decoding process performed in a reception side is available.

A reception circuit 30a further includes a decoder 306. The decoder 306 may decode the error detection bit EDB, the synchronization signal SYNC, and the pixel data RGB from the parallel data PD1 to PD4 in reverse order of that of the encoder 204. Decoded data is stored in the reception pixel buffer 308.

The error detector 312 may determine whether the parallel data PD1 to PD4 are correct or erroneous based on decoding results from the decoder 306. When the decoder 306 detects a code error, the decoder 306 asserts a code error signal CE (having a high level, for example). The code error may include an error generated when an encoding process is performed by the encoder 204, a transmission error generated when transmitted through the transmission channel 18, and an error generated when a decoding process is performed by the decoder 306, but the reception circuit 30 handles such errors as transmission errors without particularly differentiating them.

According to this modified example, since an error can be detected with a higher probability, disturbance of an image can be further suppressed.

Modified Example 2

In the embodiment, in the case where the correcting buffer 316 maintains pixel data for one pixel line or one frame has been described, but the present disclosure is not limited thereto.

For example, the correcting buffer 316 may maintain only two or four pixels most recent to a current pixel. Alternatively or additionally, pixel data for one pixel line or one frame may be compressed and maintained, or resolution may be lowered and maintained. In this case, a memory occupation may be considerably reduced.

Modified Example 3

In the embodiment, in the case where 7-phase serial data are transmitted through four lanes has been described, but the number M of lanes and the constant N are not particularly limited. Also, the number of bits of the RGB data is not particularly limited.

Modified Example 4

In the embodiment, in the case where the clock signal CK is transmitted through the clock lane LCK has been described, but the present disclosure is not limited thereto. For example, the clock signal may be incorporated into serial data by employing a clock data recovery (CDR) scheme. In this case, a problem of a phase shift (jitter) of the clock signal and the serial data can be eliminated, which allows larger data transmission.

Modified Example 5

In the embodiment, in the case in which a transmission error is detected based on (i) the error detection bit EDB and (ii) the synchronization signal, or (iii) encoded in an error detectable format has been described, but the error detection method is not particularly limited and any other scheme may also be used.

Exemplary uses of the transmission system 10 will be described.

Figure 5:
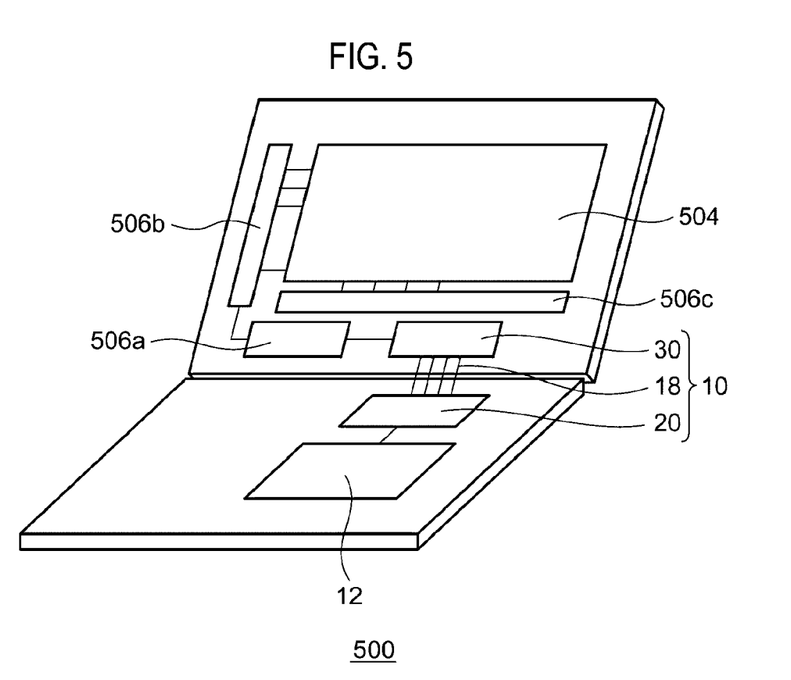
FIG. 5 is a perspective view illustrating an electronic device.

FIG. 5 is a perspective view illustrating an electronic device. The electronic device 500 of FIG. 5 may be a notebook PC, a tablet terminal, a smartphone, a portable game device, an audio player, or the like. The electronic device 500 includes an image processing device 12, the transmission system 10, and a display device 14 installed in a case 502. The display device 14 includes, specifically, a display panel 504 and a driving circuit 506. The driving circuit 506 includes a timing controller 506a, a gate driver 506b, and a data driver 506c.

Alternatively, the transmission system 10 may be used to transmit data to a display installed in a car navigation system installed in a vehicle or a console panel. In vehicle installation, strong tolerance to noise may be required, and thus, to this end, the transmission system 10 may be appropriately used. Also, the transmission system 10 may be used for a Pachinko game player, or the like. In the Pachinko game player, when a ball is hit by a nail, noise may be generated to cause a transmission error, but the use of the transmission system 10 may reduce image disturbance due to the transmission error.

According to the present disclosure in some embodiments, it is possible to provide a transmission technique capable of suppressing disturbance of an image displayed on a display panel.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A reception circuit for receiving a serial data including a first pixel data constituting an image data from a transmission circuit, wherein the serial data has a format allowing the reception circuit to detect a transmission error, the reception circuit comprising:
    a serial-to-parallel converter configured to receive the serial data and convert the received serial data into a first parallel data;
    an error detector configured to determine whether the first parallel data is correct or erroneous based on the first parallel data;
    a correcting buffer configured to maintain the first pixel data included in the first parallel data if the first parallel data is determined to be correct by the error detector; and
    a correcting unit configured to substitute the first pixel data included in the first parallel data, which is determined to be erroneous by the error detector, with a value corresponding to a second pixel data stored in the correcting buffer.

2. The reception circuit of claim 1, wherein the correcting unit is configured to substitute the first pixel data included in the first parallel data determined to be erroneous by the error detector with the second pixel data stored in the correcting buffer.

3. The reception circuit of claim 1, wherein the correcting unit is configured to substitute the first pixel data included in the first parallel data, which is determined to be erroneous by the error detector, with a value calculated from the second pixel data stored in the correcting buffer.

4. The reception circuit of claim 1, wherein the correcting unit is configured to substitute the first pixel data included in the first parallel data, which is determined to be erroneous by the error detector, with a value corresponding to a third pixel data of a pixel adjacent to a pixel associated with the second pixel data stored in the correcting buffer.

5. The reception circuit of claim 1, wherein the correcting buffer is configured to store the second pixel data for one pixel line.

6. The reception circuit of claim 1, wherein the correcting buffer is configured to store the second pixel data for one frame.

7. The reception circuit of claim 1, wherein the serial data is parallel-to-serial converted from a second parallel data including at least one bit for error detection.

8. The reception circuit of claim 1, wherein the serial data is parallel-to-serial converted from a second parallel data, the second parallel data being encoded in a format allowing the reception circuit to detect a transmission error through a decoding process in the reception circuit, and wherein the reception circuit further comprises a decoder configured to decode the first parallel data which is converted by the serial-to-parallel converter and to detect a code error.

9. The reception circuit of claim 1, wherein the serial data is parallel-to-serial converted from a second parallel data, the second parallel data including a synchronization signal that is regularly changed over time in addition to the first pixel data, and wherein the error detector is configured to determine whether the first parallel data is correct or erroneous by comparing the synchronization signal included in the first parallel data with an expectation pattern corresponding to the synchronization signal.

10. The reception circuit of claim 9, further comprising:
a synchronization signal generating unit configured to compare the synchronization signal with the expectation pattern corresponding to the synchronization signal and correct the synchronization signal based on the expectation pattern if the synchronization signal is different from the expectation pattern.

11. The reception circuit of claim 1, wherein the serial data includes M bits where M is an integer equal to or greater than 2 and is transmitted through parallel N lanes where N is an integer equal to or greater than 2, and wherein M×N bits including R data, G data, and B data as the first pixel data are transmitted at a time.

12. The reception circuit of claim 11, wherein M is equal to or greater than 7, N is 4, and each of the R data, the G data, and the B data have 8 bits, and wherein at least 28 bits including 1 bit of an enable signal, 1 bit of a vertical synchronization signal, and 1 bit of a horizontal synchronization signal, in addition to 24 bits of the first pixel data are transmitted at a time.

13. The reception circuit of claim 12, wherein the at least 28 bits further include 1 bit for error detection.

14. The reception circuit of claim 1, wherein the reception circuit is integrally integrated on a single semiconductor substrate.

15. An electronic device comprising the reception circuit of claim 1.

16. A method of transmitting a first pixel data constituting an image data, comprising:

generating, by a transmission unit, a serial data having the first pixel data and a format allowing a reception unit to detect a transmission error;

converting, by the reception unit, the serial data into a first parallel data;

determining whether the first parallel data is correct or erroneous based on the first parallel data;

maintaining the first pixel data included in the first parallel data in a correcting buffer if the first parallel data is determined to be correct; and substituting the first pixel data included in the first parallel data, which is determined to be erroneous, with a value corresponding to a second pixel data stored in the correcting buffer.

17. The method of claim 16, further comprising adding, by the transmission unit, at least one bit for error detection to second parallel data, wherein the serial data is parallel-to-serial converted from the second parallel data, and wherein the determining whether the first parallel data is correct or erroneous includes detecting a transmission error based on the at least one bit for error detection.

18. The method of claim 16, further comprising encoding, by the transmission unit, a second parallel data in a format allowing the reception unit to detect a transmission error through a decoding process in the reception unit, wherein the serial data is parallel-to-serial converted from the second parallel data, and wherein the determining whether the first parallel data is correct or erroneous includes detecting a transmission error based on the decoding process in the reception unit.

19. The method of claim 16, further comprising adding, by the transmission unit, a synchronization signal that is regularly changed over time to a second parallel data in addition to the first pixel data, wherein the serial data is parallel-to-serial converted from the second parallel data, and wherein the determining whether the first parallel data is correct or erroneous includes determining whether the first parallel data is correct or erroneous by comparing the synchronization signal with an expectation pattern corresponding to the synchronization signal.

20. The method of claim 19, further comprising correcting the synchronization signal based on the expectation pattern if the synchronization signal is different from the expectation pattern.

* * * * *